(12) United States Patent
Katagiri et al.

(10) Patent No.: US 6,939,629 B2
(45) Date of Patent: Sep. 6, 2005

(54) HUMIDIFYING SYSTEM FOR A FUEL CELL

(75) Inventors: Toshikatsu Katagiri, Saitama (JP); Hiroshi Shimanuki, Saitama (JP); Motohiro Suzuki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 440 days.

(21) Appl. No.: 10/190,072

(22) Filed: Jul. 3, 2002

(65) Prior Publication Data

US 2003/0008189 A1 Jan. 9, 2003

(30) Foreign Application Priority Data

Jul. 5, 2001 (JP) ........................................ 2001-204286

(51) Int. Cl.$^7$ ............................................... H01M 8/00
(52) U.S. Cl. ........................................................ 429/12
(58) Field of Search ............................. 429/12, 17, 34, 429/13, 26, 22

(56) References Cited

U.S. PATENT DOCUMENTS 6,596,429 B2 * 7/2003 Shimanuki et al. ........... 429/34
6,713,204 B2 * 3/2004 Shimanuki et al. ........... 429/26
6,805,988 B2 * 10/2004 Shimanuki et al. ........... 429/34

* cited by examiner

Primary Examiner—Patrick Joseph Ryan
Assistant Examiner—Melissa Austin
(74) Attorney, Agent, or Firm—Lahive & Cockfield, LLP; Anthony A. Laurentano, Esq.

(57) ABSTRACT

A humidifying system for a fuel cell includes: a fuel cell having an anode and a cathode, the anode being supplied with a fuel gas and the cathode being supplied with an oxidant gas so that the fuel gas and the oxidant gas chemically react within the fuel cell to generate electricity; a first humidifier transferring moisture of cathode exhaust gas discharged from the cathode of the fuel cell to the fuel gas through hollow fiber membranes; a second humidifier transferring moisture of cathode exhaust gas discharged from the first humidifier to the oxidant gas through hollow fiber membranes; and a reduced pressure generating device arranged downstream of the first humidifier and between the first humidifier and the fuel cell to mix part of anode exhaust gas discharged from the anode of the fuel cell with the fuel gas using negative pressure resulting from a flow of the fuel gas.

8 Claims, 6 Drawing Sheets

RELATION OF UPSTREAM PRESSURE OF EJECTOR IN MAINSTREAM DIRECTION RELATIVE TO OUTPUT OF FUEL CELL

FIG.5

DEW POINT AT UPSTREAM SIDE OF EJECTOR IN MAINSTREAM DIRECTION APPROACHES DEW POINT AT DOWNSTREAM SIDE OF EJECTOR

HUMIDIFYING SYSTEM FOR A FUEL CELL

FIELD OF THE INVENTION

The present invention relates to a humidifying system for a fuel cell, and more particularly to a humidifying system for a fuel cell which humidifies a fuel gas and an oxidant gas respectively supplied to the fuel cell with the use of hollow fiber membranes.

BACKGROUND OF THE INVENTION

In recent years, polymer electrolyte fuel cells have been drawing attention as a power source for electric vehicles. Polymer electrolyte fuel cells (PEFC) have been adapted in practical use for various applications as they generate electricity at ordinary temperature.

Generally, a fuel cell system is divided into the cathode and the anode by a solid polymer electrolyte membrane, and oxygen in the air and hydrogen in a fuel gas are supplied to the cathode and the anode, respectively, so that oxygen and hydrogen are chemically reacted to generate electricity for driving an outer load.

As one important parameter which affects power generation efficiency in the fuel cell system, the ionic conductivity of hydrogen ions migrating in the solid polymer electrolyte membrane is considered. The higher the ionic conductivity, the more the number of hydrogen ions that can migrate in the solid polymer electrolyte membrane per unit of time increases. Therefore, the amount of electricity generated by the electrochemical reaction will increase proportionally.

However, in order to maintain a high ionic conductivity, it is required that moisture be applied to the solid polymer electrolyte membrane at all times to prevent the membrane from drying. For this reason, the fuel cell system must include a humidifier.

As a humidifier used in this purpose, a supersonic humidifier, a nozzle injection humidifier, a steam humidifier, and the like may be employed. However, in terms of less electric power consumption and less installation space, a humidifier utilizing hollow fiber membranes is generally used.

Figure 8:
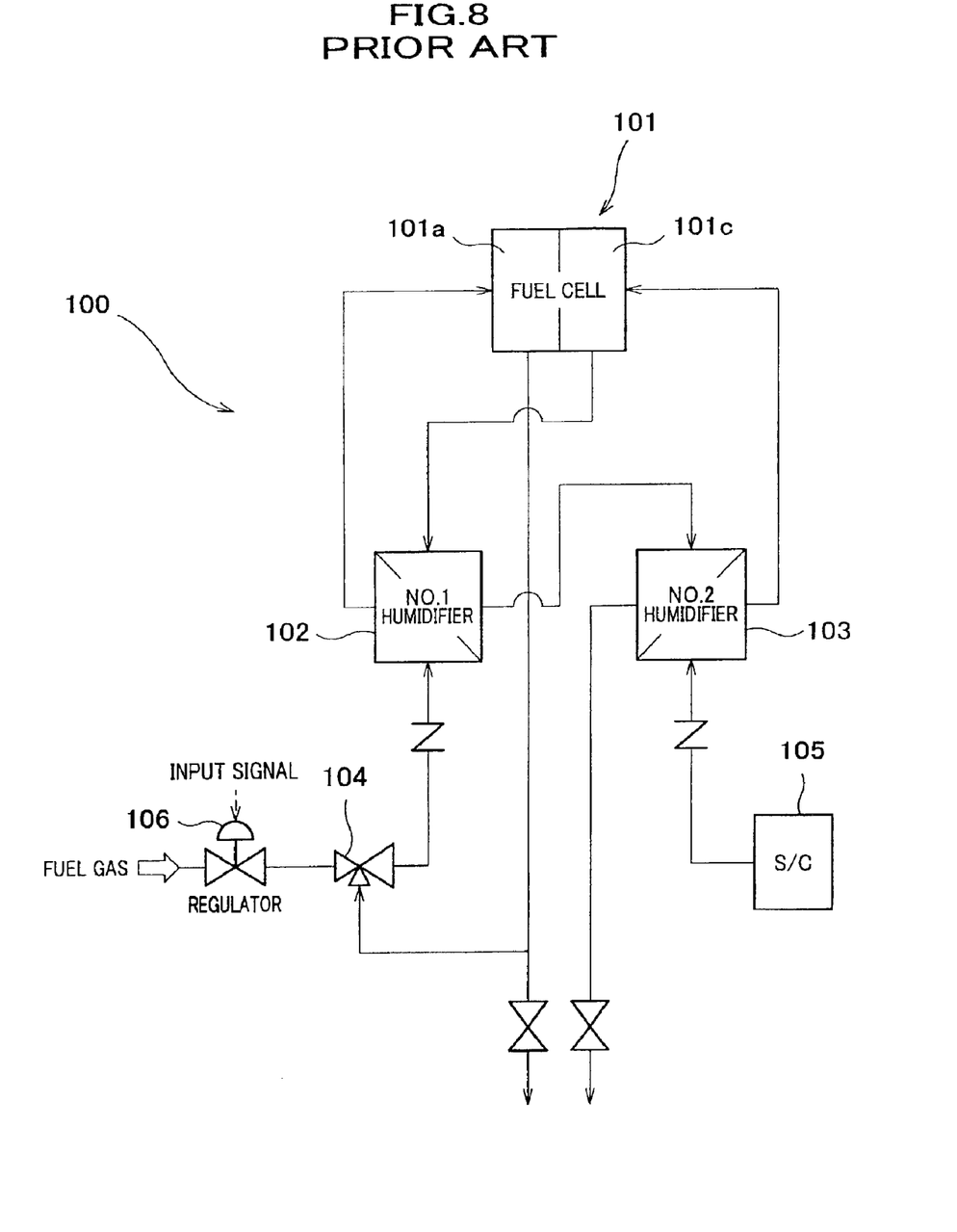
FIG. 8 illustrates the overall arrangement of a conventional humidifying system for a fuel cell.

One example of a humidifying system for a fuel cell equipped with a humidifier utilizing hollow fiber membranes is illustrated in FIG. 8.

This humidifying system 100 for a fuel cell mainly comprises: a fuel cell 101 having the anode 101a to which hydrogen in a fuel gas is supplied and the cathode 101c to which oxygen in the air is supplied as an oxidant gas so that hydrogen and oxygen are reacted to generate electricity; two humidifiers 102, 103 humidifying gases respectively supplied to the anode 101a and the cathode 101c of the fuel cell 101 by moisture-exchanging with cathode exhaust gas discharged from the cathode 101c of the fuel cell 101; an ejector 104 supplying a fuel gas to the anode 101a in a circulating manner; and a supercharger (S/C) 105 supplying air as an oxidant gas to the cathode 101c. Herein, the fuel cell 101 is considered as a constituent element of the humidifying system 100.

Manner of operation of this humidifying system 100 will be described.

A fuel gas containing no moisture or a little moisture is adjusted by a regulator 106 to a constant pressure and supplied to an ejector 104. The fuel gas is then fed to a humidifier 102 after passing through the ejector 104.

The fuel gas (low humidity gas) supplied to the humidifier 102 is humidified by cathode exhaust gas (high humidity gas) discharged from the cathode 101c of the fuel cell 101 while passing through a humidifying module within the humidifier 102, and then supplied to the anode 101a of the fuel cell 101. Hydrogen contained in the fuel gas supplied to the anode 101a reacts with oxygen in the air that is supplied from the S/C (supercharger) 105 to the fuel cell 101, and generates electricity. Remaining fuel gas that has been unreacted at the fuel cell 101 is supplied to the subsequent steps (e.g., catalyst combustor) as anode exhaust gas. Part of the anode exhaust gas is sucked by the ejector 104 and recirculates as a fuel gas.

Meanwhile, air that is a low humidity gas in the air is sucked and pressurized by the S/C (supercharger) 105, and is supplied to the humidifier 103.

The air (low humidity gas) supplied to the humidifier 103 is humidified by cathode exhaust gas (high humidity gas) discharged from the humidifier 102 while passing through a humidifying module within the humidifier 103, and then supplied to the cathode 101c of the fuel cell 101. Remaining air that has been unreacted at the fuel cell 101 with hydrogen in the fuel gas is firstly supplied to the humidifier 102 as cathode exhaust gas which is a high humidity gas. The cathode exhaust gas supplied to the humidifier 102 gives moisture to the fuel gas supplied from the ejector 104 to the humidifier 102 while passing through the humidifying module within the humidifier 102, and is discharged from the humidifier 102. Subsequently, the cathode exhaust gas discharged from the humidifier 102 is supplied to the humidifier 103, and gives moisture to air supplied from the S/C (supercharger) 105 to the humidifier 103 while passing through the humidifying module within the humidifier 103. Cathode exhaust gas discharged from the humidifier 103 is supplied to the subsequent steps (e.g., catalyst combustor).

However, such a conventional humidifying system for a fuel cell has the following drawbacks.

Figure 9:
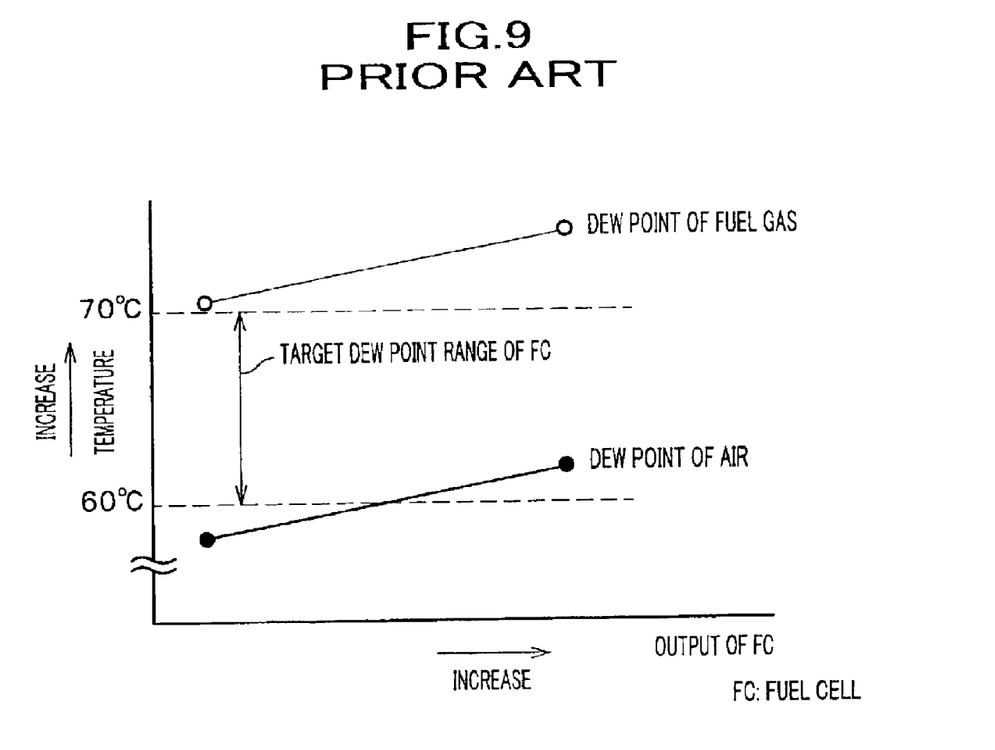
FIG. 9 is a graph illustrating a relation between the dew point of a fuel gas and the dew point of air when the conventional humidifying system is adapted.

(1) A fuel gas supplied to the fuel cell 101 is required to have a constant relative humidity. However, heat of reaction increases proportionally with increasing output of the fuel cell 101 because the chemical reaction at the fuel cell is exothermic reaction, and the temperature of exhaust gas discharged from the fuel cell 101 inevitably increases. For this reason, in the humidifier 102 where a fuel gas supplied to the fuel cell 101 is humidified, a fuel gas is humidified by high temperature cathode exhaust gas containing supersaturated moisture (having high partial pressure of water vapor), and as shown in FIG. 9, the fuel gas is over-humidified (the dew point becomes higher) relative to the target dew point range required for the fuel cell 101. As a result, if cathode exhaust gas continues to humidify the fuel gas, so-called flooding may arise, that is, water pools in gaps formed between solid polymer electrolyte membranes, which are stacked in the form of a fuel cell stack, and clogs gas flow passages.

(2) Meanwhile, in the humidifier 103 where air supplied to the fuel cell is humidified, since a fuel gas is over-humidified in the humidifier 102 by cathode exhaust gas, the amount of moisture for humidifying air that is an oxidant gas supplied to the fuel cell 101 is liable to be insufficient, and as shown in FIG. 9, the dew point of air lowers relative to the target dew point range required for the fuel cell 101. As a result, the solid polymer electrolyte membrane of the fuel cell 101 gets dry, preventing stable generation of electricity.

The inventors attempt to vary the length and the number of the hollow fiber membranes in the humidifier 102 for the purpose of preventing a fuel gas from being over-humidified. However, in the graph of FIG. 9 illustrating the relation between the output of the fuel cell 101 and the dew point, the dew point of a fuel and the dew point of air merely shifted vertically, and it was impossible to obtain a horizontal slope for the lines. Furthermore, when the fuel cell 101 was operated at a high output, another drawback arose in that the amount of humidification was insufficient.

In view of the above, the present invention provides a humidifying system for a fuel cell which achieves the optimum balance between the humidification of a fuel gas supplied to the fuel cell and the humidification of an oxidant gas supplied to the fuel cell even at a high output of the fuel cell 101.

SUMMARY OF THE INVENTION

According to a first aspect of the invention, there is provided a humidifying system for a fuel cell comprising:

a fuel cell having an anode and a cathode, the anode being supplied with a fuel gas and the cathode being supplied with an oxidant gas so that the fuel gas and the oxidant gas chemically react within the fuel cell to generate electricity;

a first humidifier transferring moisture of cathode exhaust gas discharged from the cathode of the fuel cell to the fuel gas through hollow fiber membranes;

a second humidifier transferring moisture of cathode exhaust gas discharged from the first humidifier to the oxidant gas through hollow fiber membranes; and a reduced pressure generating device arranged downstream of the first humidifier and between the first humidifier and the fuel cell to mix part of anode exhaust gas discharged from the anode of the fuel cell with the fuel gas by the aid of negative pressure resulting from a flow of the fuel gas.

According to a second aspect of the invention, there is provided a method of humidifying gases supplied to a fuel cell comprising the steps of:

supplying a fuel gas and an oxidant gas from a fuel gas supplying device and an oxidant gas supplying device to an anode and a cathode of the fuel cell, respectively, so that the fuel gas and the oxidant gas chemically react within the fuel cell to generate electricity;

humidifying the fuel gas at a first humidifier arranged downstream of the fuel cell by transferring moisture of cathode exhaust gas discharged from the cathode of the fuel cell to the fuel gas through hollow fiber membranes; and humidifying the oxidant gas at a second humidifier arranged in series with and downstream of the first humidifier by transferring moisture of cathode exhaust gas discharged from the first humidifier to the oxidant gas through hollow fiber membranes;

wherein the method further comprises the step of mixing part of anode exhaust gas discharged from the anode of the fuel cell with the fuel gas at a reduced pressure generating device which is arranged between the first humidifier and the fuel cell and at which a flow of the fuel gas causes negative pressure.

Furthermore, according to a third aspect of the invention, there is provided a humidifying system for a fuel cell comprising:

a fuel cell having an anode and a cathode, the anode being supplied with a fuel gas and the cathode being supplied with an oxidant gas so that the fuel gas and the oxidant gas chemically react within the fuel cell to generate electricity;

a first humidifier transferring moisture of cathode exhaust gas discharged from the cathode of the fuel cell to the fuel gas through hollow fiber membranes;

a second humidifier transferring moisture of cathode exhaust gas discharged from the first humidifier to the oxidant gas through hollow fiber membranes; and a reduced pressure generating device for mixing part of anode exhaust gas discharged from the anode of the fuel cell with the fuel gas by the aid of negative pressure resulting from a flow of the fuel gas, wherein the reduced pressure generating device is arranged downstream of the first humidifier and between the first humidifier and the fuel cell such that, irrespective of a change in the output of the fuel cell, the fuel gas supplied to the fuel cell has a substantially constant relative humidity.

With such an arrangement of the first through the third aspects of the invention that the first humidifier is arranged upstream of the reduced pressure generating device, the following advantages are obtained.

(1) In the conventional arrangement where the first humidifier is arranged downstream of the reduced pressure generating device, the fuel cell is supplied with a fuel gas that is over-humidified. However, in the arrangement of the present invention where the reduced pressure generating device is arranged downstream of the humidifier, a fuel gas discharged from the humidifier is decompressed by the reduced pressure generating device, thereby decreasing the relative humidity. Since the greater the output of the fuel cell is, the more the relative humidity is decreased by the reduced pressure generating device, it is possible to supply the fuel cell with a fuel gas having a substantially constant relative humidity over the entire range regardless of the output of the fuel cell.

(2) Accordingly, unlike the conventional arrangement, the fuel cell is not supplied with a fuel gas that is over-humidified, and so sufficient moisture is applied to the second humidifier arranged downstream of the first humidifier. As a result, even if the output of the fuel cell increases to a greater value, a balance between humidification of a fuel gas supplied to the fuel cell and humidification of an oxidant gas supplied to the fuel cell can be retained.

(3) When compared with the conventional arrangement where the humidifier is arranged downstream of the reduced pressure generating device, it is possible to apply a high pressure to the fuel gas inlet of the first humidifier because pressure loss at the reduced pressure generating device does not affect the first humidifier. Therefore, even if the output of the fuel cell varies from a small value to a large value, it is possible to avoid increased pressure fluctuation in the first humidifier. As a result, the service life of the hollow fiber membranes is extended.

(4) Further, since the circulating line for which the reduced pressure generating device circulates a fuel gas becomes short in length, pressure loss in the circulating line is smaller than the conventional arrangement, and by this relative position of the reduced pressure generating device, it is possible to humidify a fuel gas at a higher pressure comparing with the conventional arrangement, leading to reduced amount of humidification. Therefore, the first humidifier is reduced in size.

In the first through the third aspects of the invention, the reduced pressure generating device may be an ejector.

With such a constitution, since an ejector is provided as the reduced pressure generating device which mixes a fuel gas and anode exhaust gas discharged from the anode of the fuel cell, flowing the fuel gas as a mainstream of the ejector causes negative pressure to suck and circulate exhaust gas discharged from the anode of the fuel cell. Unlike a vacuum pump, the ejector does not have a moving part, such as a rotating or sliding part, so consumption of electric power is not required. Furthermore, because of its simple structure, maintenance and inspection will be carried out without any difficulty.

Further, the reduced pressure generating device (ejector) according to the third aspect of the invention preferably has a feature such that a dew point of the fuel gas at a downstream thereof is substantially constant irrespective of dew points of the fuel gas at an upstream thereof.

Herein, the term "mainstream of the ejector" indicates a flow within the ejector in a direction from the humidifier to the fuel cell (viz., a flow for causing negative pressure).

BRIEF DESCRIPTION OF THE DRAWINGS

A preferred embodiment of the present invention will be described below, by way of example only, with reference to the accompanying drawings, in which.

DESCRIPTION OF THE PREFERRED EMBODIMENT

With reference to FIGS. 1 through 7, a preferred embodiment of the invention will be described.

Firstly, a humidifying system for a fuel cell according to the present invention will be described.

Figure 1:
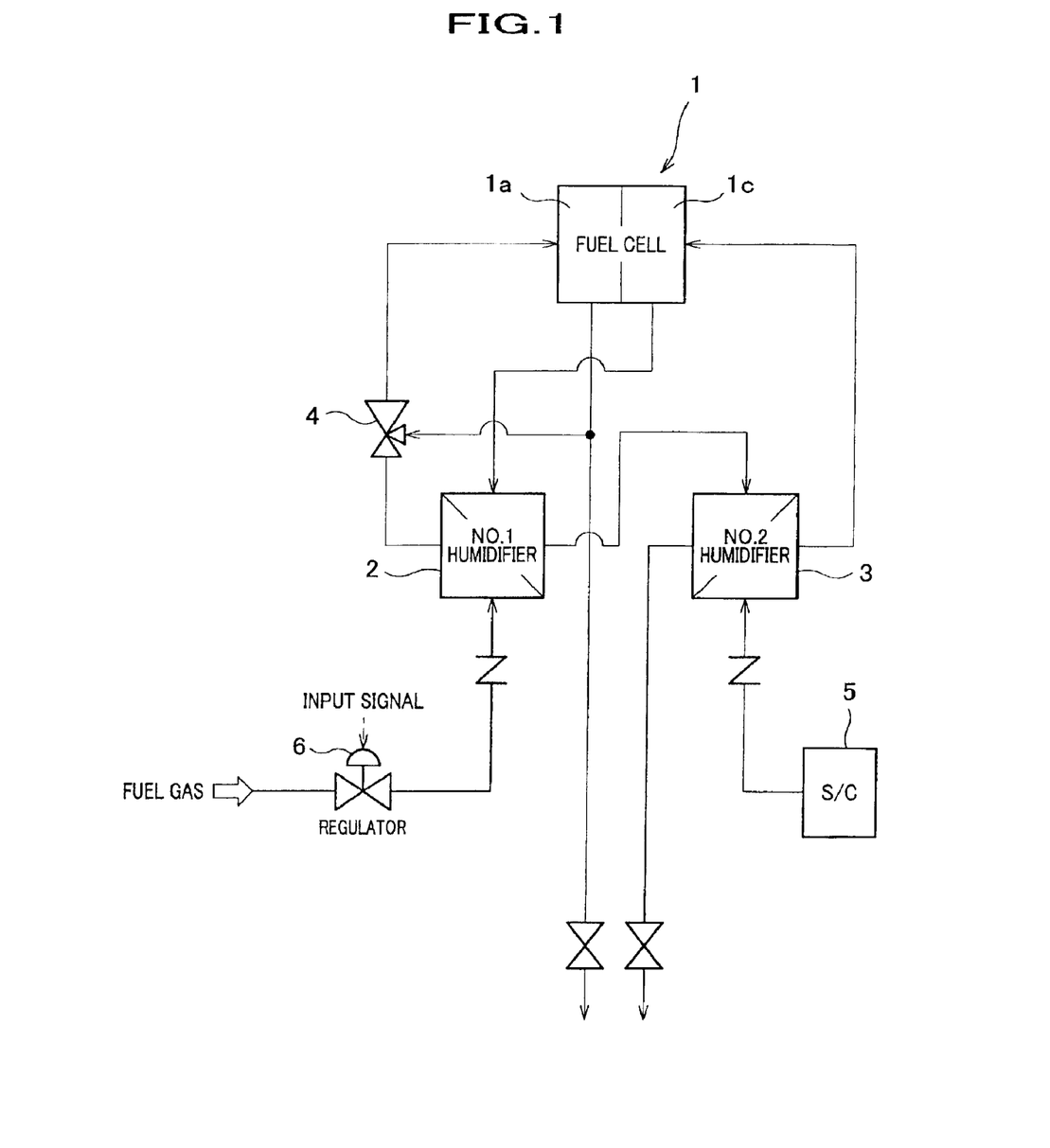
FIG. 1 illustrates the overall arrangement of a humidifying system for a fuel cell according to the invention.

Herein, FIG. 1 illustrates the overall arrangement of a humidifying system for a fuel cell according to the invention.

The humidifying system for a fuel cell mainly comprises: a fuel cell 1 in which hydrogen contained in a fuel gas is supplied to the anode 1a and oxygen contained in the air is supplied to the cathode 1c as an oxidant gas such that hydrogen and oxygen react to generate electricity; two humidifiers 2, 3 for humidifying gases respectively supplied to the anode 1a and the cathode 1c of the fuel cell 1 by moisture-exchanging respectively with cathode exhaust gas discharged from the cathode 1c of the fuel cell 1; an ejector 4 as a reduced pressure generating device for supplying a fuel gas to the anode 1a while circulating the same; and a S/C (supercharger) 5 for supplying air as an oxidant gas to the cathode 1c. The fuel cell 1 is included in the humidifying system.

The fuel cell (polymer electrolyte fuel cell) 1 generates electricity by the reaction of hydrogen in a fuel gas and oxygen in the air. This reaction is shown by the following reaction. Equation (1) expresses the reaction at the anode 1a, and Equation (2) expresses the reaction at the cathode 1c. As the whole fuel cell, the reaction process as expressed by Equation (3). Accordingly, water is produced at the cathode 1c of the fuel cell 1 as the reaction of the fuel cell proceeds. Normally, produced water is vaporize within the air supplied to the cathode 1c and discharged from the fuel cell 1 together with unreacted air.

$$H_2 \rightarrow 2H^+ + 2e^- \tag{1}$$

$$2H^+ + (\tfrac{1}{2})O_2 + 2e^- \rightarrow H_2O \tag{2}$$

$$H_2 + (\tfrac{1}{2})O_2 \rightarrow H_2O \tag{3}$$

The fuel cell 1 utilizes a solid polymer electrolyte membrane (e.g., perfluorocarbon sulfonic acid made membrane, the product name: NAFION) as an electrolyte layer. The fuel cell 1 has a structure comprising a plurality of stacked single cells each comprising a pair of gas diffusion electrodes sandwiching therebetween the solid polymer electrolyte membrane, and a pair of separators sandwiching the gas diffusion electrodes from the outside to separate a fuel gas and air.

The two humidifiers include a humidifier 2 for a fuel gas as a first humidifier and a humidifier 3 for air as a second humidifier, both of which utilize water permeable hollow fiber membranes. As the principle of humidification, they utilize difference in partial pressures of water vapor contained in gases respectively flowing through the inside and the outside of the hollow fiber membranes. As the hollow fiber membranes, a porous membrane through which not only water vapor but also other gaseous molecules can permeate is used. Alternatively, it is possible to select and use a water permeable membrane which conducts protons under hydration of ion.

Furthermore, each of the two humidifiers includes, for example, a tubular housing in which is accommodated a bundle of hollow fiber membranes formed by binding a plurality of hollow fiber membranes such that fluids having different water contents are respectively flown inside and outside of the hollow fiber membranes to exchange moisture thereof.

The ejector 4 as the reduced pressure generating device is arranged between the humidifier 2 for a fuel gas and the fuel cell 1. The ejector 4 is a kind of vacuum pump for circulating a fuel gas supplied to the anode 1a, and mainly comprises a nozzle, a diffuser, and a suction chamber.

The ejector 4 generates negative pressure by flowing a fuel gas in the mainstream direction, thereby sucking anode exhaust gas discharged from the anode 1a of the cell 1 and circulating it as a fuel gas. Circulating a fuel gas enhances the combustion efficiency of a fuel gas. Herein, the term "mainstream" of the ejector 4 indicates a flow within the ejector 4 in a direction from the humidifier 2 to the fuel cell 1 (viz., a flow for causing negative pressure).

Further, unlike a vacuum pump, since the ejector 4 does not have a moving part such as a rotating or sliding part, consumption of electric power is not required, and because of its simple structure, maintenance and inspection will be carried out without any difficulty.

Although the ejector 4 is used in this preferred embodiment as the reduced pressure generating device, a vacuum pump may be employed in place of the ejector 4.

The S/C (supercharger) 5 is a mechanical supercharger which sucks and pressurizes air having atmospheric pressure and then supplies it to the cathode 1c of the fuel cell 1.

A positive-displacement Lysholm-type compressor may be employed in place of the S/C (supercharger) 5.

With reference to FIGS. 2 through 5, the characteristic of the ejector used for the humidifying system for the fuel cell shown in FIG. 1 will be described.

Figure 2:
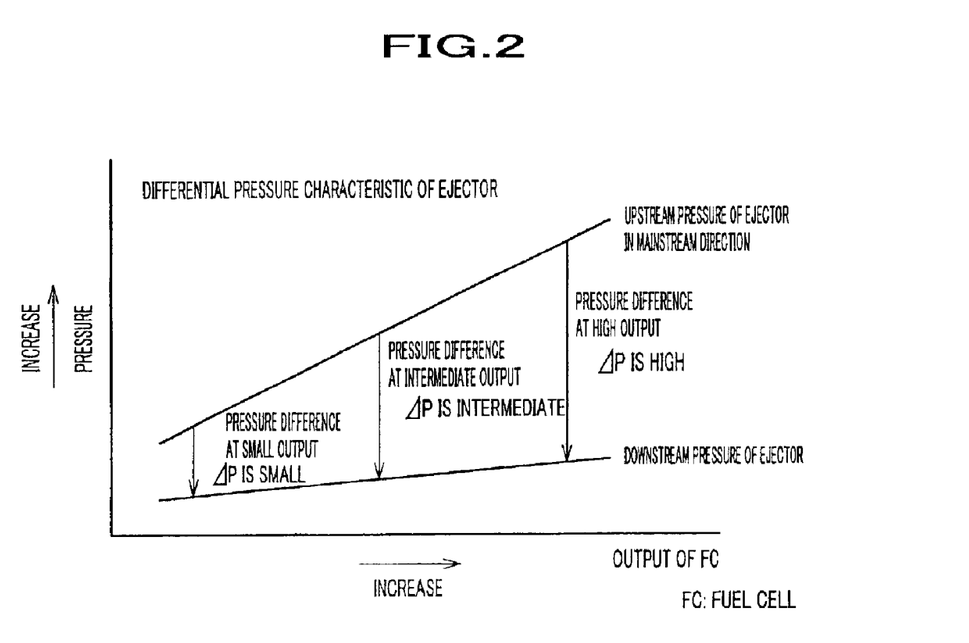
FIG. 2 is a graph illustrating the differential pressure characteristic of an ejector relative to the output of the fuel cell.

Firstly, the differential pressure characteristic of the ejector 4 relative to the output of the fuel cell 1 is shown in FIG. 2.

As is apparent from the figure, if a high output is required for the fuel cell 1, the amount of a fuel gas is increased, thereby increasing a pressure difference between the upstream pressure of the ejector 4 in the mainstream direction and the downstream pressure of the ejector 4. Meanwhile, if the output of the fuel cell 1 decreases to a smaller value, the amount of a fuel gas is decreased, thereby decreasing the pressure difference. Herein, the term "mainstream" of the ejector 4 indicates a flow within the ejector 4 in a direction from the humidifier 2 to the fuel cell 1 (viz., a flow for causing negative pressure).

Figure 3:
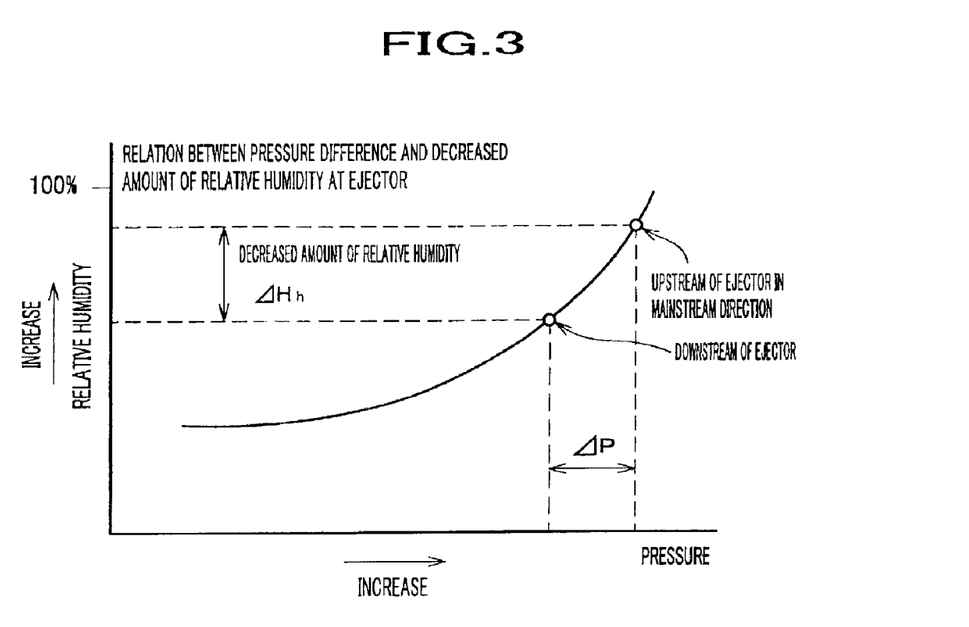
FIG. 3 is a graph illustrating a relation between the pressure difference and the decreased amount of the relative humidity at the ejector.

A relation between the pressure difference and the decreased amount of the relative humidity at the ejector 4 is shown in FIG. 3.

As is apparent from the figure, the decreased amount of the relative humidity through the ejector 4 is large in a high pressure region. However, in a low pressure region, since the change amount of the relative humidity with respect to the pressure is small, the decreased amount of the relative humidity with respect to the pressure difference is small.

In other words, if the composition and the temperature of a fuel gas along the mainstream of the ejector 4 are constant at the upstream and downstream of the ejector 4, the partial pressure of water vapor in a fuel gas at the downstream of the ejector 4 decreases with increasing pressure loss at the ejector 4 (with increasing output of the fuel cell 1). This leads to an increase in the decreased amount of the relative humidity due to decreased partial pressure of water vapor relative to the saturated vapor pressure.

Meanwhile, the decreased amount of the relative humidity at the ejector 4 in the mainstream direction decreases with decreasing upstream pressure of the ejector 4 in the mainstream direction (with decreasing output of the fuel cell 1). In other words, since the difference in the partial pressure of water vapor is small at the upstream and downstream the ejector 4 in the mainstream direction, the decreased amount of the relative humidity of a fuel gas becomes small.

Figure 4:
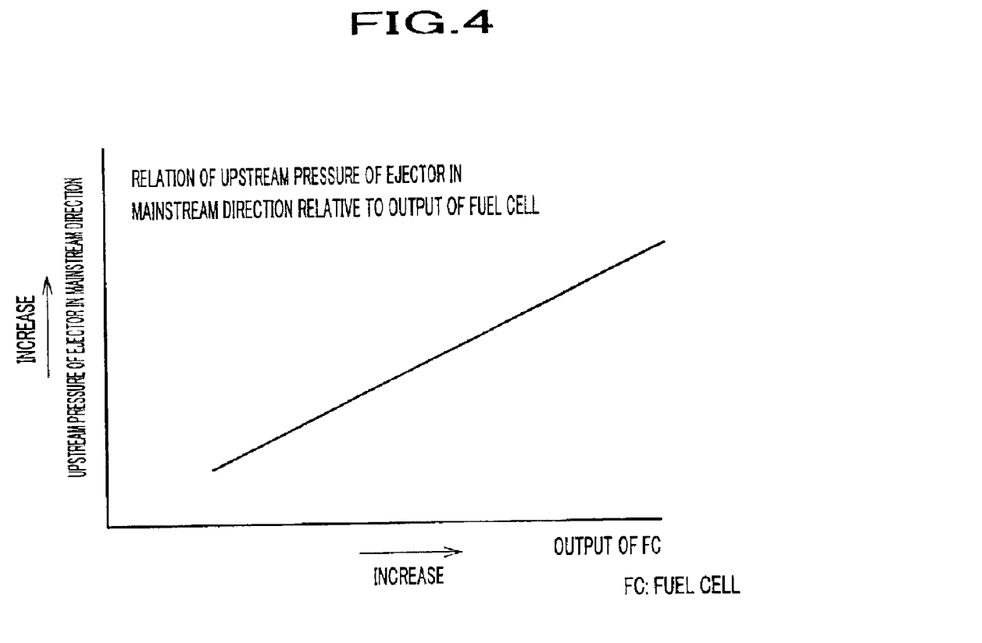
FIG. 4 is a graph illustrating a relation of the upstream pressure of the ejector in the mainstream direction relative to the output of the fuel cell.

A relation between the upstream pressure of the ejector 4 in the mainstream direction and the output of the fuel cell 1 is shown in FIG. 4.

As is apparent from the figure, since the required amount of a fuel gas increases in proportion to an increment in the output required for the fuel cell 1, the upstream pressure of the ejector 4 in the mainstream direction increases with increasing output of the fuel cell 1.

Figure 5:
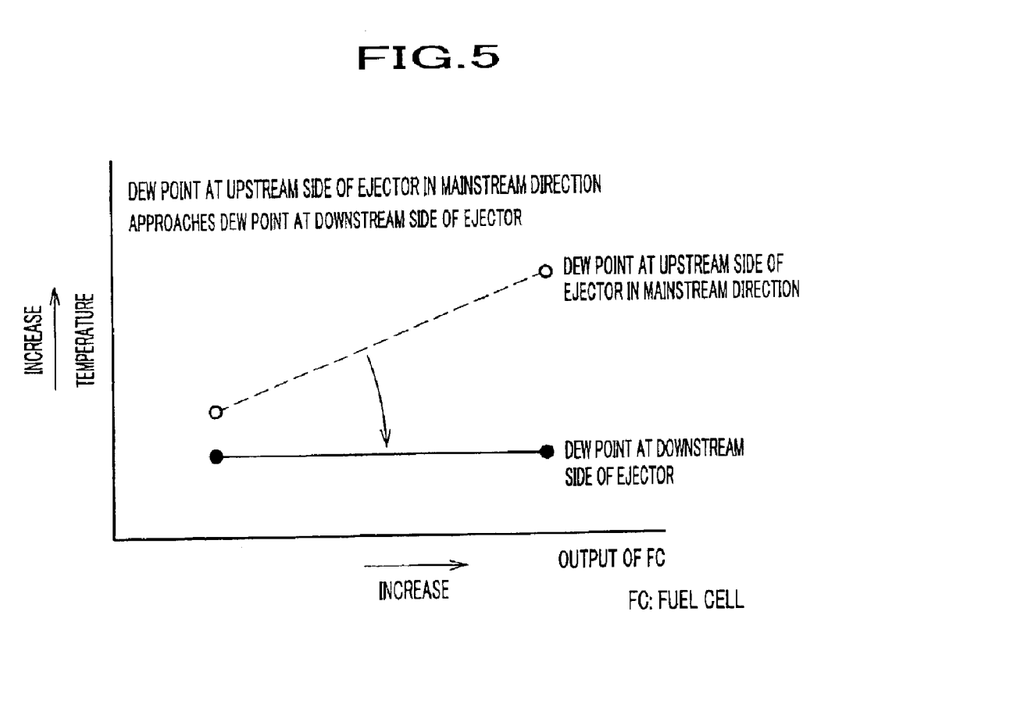
FIG. 5 is a graph indicating that the dew point of a fuel gas at an upstream side of the ejector in the mainstream direction approaches to the dew point of a fuel gas at a downstream side of the ejector due to the effect such that the relative humidity at the ejector is decreased with respect to the output of the fuel cell.

Next, a change in the dew point of a fuel gas supplied to the fuel cell 1 with respect to the output of the fuel cell 1 is shown in FIG. 5. As is apparent from the figure, the dew point of a fuel gas corresponding to the upstream pressure of the ejector 4 in the mainstream direction increases with increasing output of the fuel cell 1.

However, when the output of the fuel cell 1 increases, the upstream pressure of the ejector 4 in the mainstream direction increases, see FIG. 4. And when the upstream pressure of the ejector 4 in the mainstream direction increases, the decreased amount of the relative humidity increases with respect to the pressure difference of the ejector 4, see FIG. 3.

(1) Therefore, since the decreased amount of the relative humidity increases even if the output of the fuel cell 1 increases, as shown in FIG. 5, the slope of the line indicating the dew point of a fuel gas at the downstream of the ejector 4 lies horizontally with respect to the ever-increasing line indicating the dew point at the upstream of the ejector 4 in the mainstream direction.

(2) As a result, the dew point of a fuel gas at the downstream of the ejector 4 is substantially constant over the entire range regardless of the output of the fuel cell 1.

Therefore, a fuel gas supplied to the anode 1a of the fuel cell 1 is supplied as a fuel gas having a substantially constant relative humidity regardless of the output of the fuel cell 1.

Manner of operation of the humidifying system equipped with an ejector 4 having the aforementioned characteristics will be described with reference to FIG. 1.

In accordance with a driving status of the fuel cell 1, a fuel gas of which pressure has been adjusted by the regulator 6 is supplied from a high pressure hydrogen source to the humidifier 2 for a fuel gas that functions as the first humidifier.

A fuel gas (which contains no moisture or which is a low humidity gas) supplied to the humidifier 2 is humidified by cathode exhaust gas (high humidity gas) discharged from the cathode 1c of the fuel cell 1 while passing through the humidifying module of the humidifier 2, and then supplied to the ejector 4.

The fuel gas supplied to the ejector 4 is adjusted, while flowing through the interior of the ejector 4, such that the relative humidity thereof decreases to a proper relative humidity suitable for driving the fuel cell 1, and then supplied to the anode 1a of the fuel cell 1. Hydrogen contained in the fuel gas that is supplied to the anode 1a of the fuel cell 1 reacts with oxygen contained in the air that is supplied from the S/C (supercharger) 5 to the fuel cell 1 and generates electricity. Remaining fuel gas that has been unused for the reaction at the fuel cell 1 is discharged as anode exhaust gas and supplied to the subsequent steps (e.g., catalyst combustor). It is noted that part of anode exhaust gas is sucked by the ejector 4 and recirculated as a fuel gas.

Meanwhile, air as a low moisture gas in the atmosphere is sucked and pressurized by the S/C (supercharger) 5, and then it is supplied to the humidifier 3 for air.

The air (low humidity gas) supplied to the humidifier 3 for air is humidified by cathode exhaust gas (high humidity gas) discharged from the humidifier 2 for a fuel gas while passing through the humidifying module within the humidifier 3, and then it is supplied to the cathode 1c. Remaining air that has been unused for the reaction at the fuel cell 1 with hydrogen in a fuel gas is discharged as cathode exhaust gas that is a high humidity gas, and it is supplied to the humidifier 2.

The cathode exhaust gas supplied to the humidifier 2 humidifies a fuel gas, of which pressure is adjusted by the regulator 6 in accordance with a driving status of the fuel cell 1 and which is supplied to the humidifier 2, while flowing through the interior of the humidifying module within the humidifier 2, and then it is discharged from the humidifier 2. The cathode exhaust gas discharged from the humidifier 2 is further supplied to the humidifier 3 and then humidifies air, which is supplied from the S/C (supercharger) 5 to the humidifier 3, while flowing through the interior of the humidifying module within the humidifier 3. Cathode exhaust gas discharged from the humidifier 3 is supplied to the subsequent steps (e.g., catalyst combustor).

Figure 6:
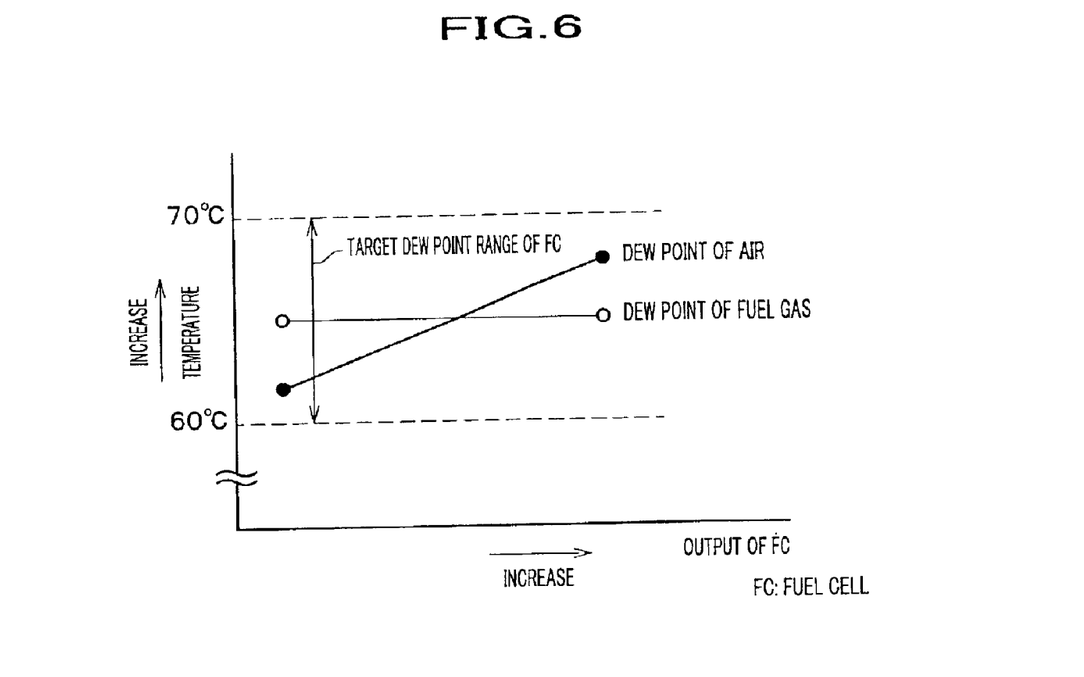
FIG. 6 is a graph illustrating a relation between the dew point of a fuel gas and the dew point of air respectively supplied to the fuel cell when the humidifying system is actually adapted.

Actually measured data regarding the dew point of a fuel gas and the dew point of air respectively supplied to the fuel cell is shown in FIG. 6, wherein the humidifying system for the fuel cell having the above structure and characteristics is actually adapted. As is apparent from the figure, the dew point of a fuel gas and the dew point of air were set in the target range of between 60–70° C. regardless of the output of the fuel cell. It should be noted that the target value shows one example.

Figure 7:
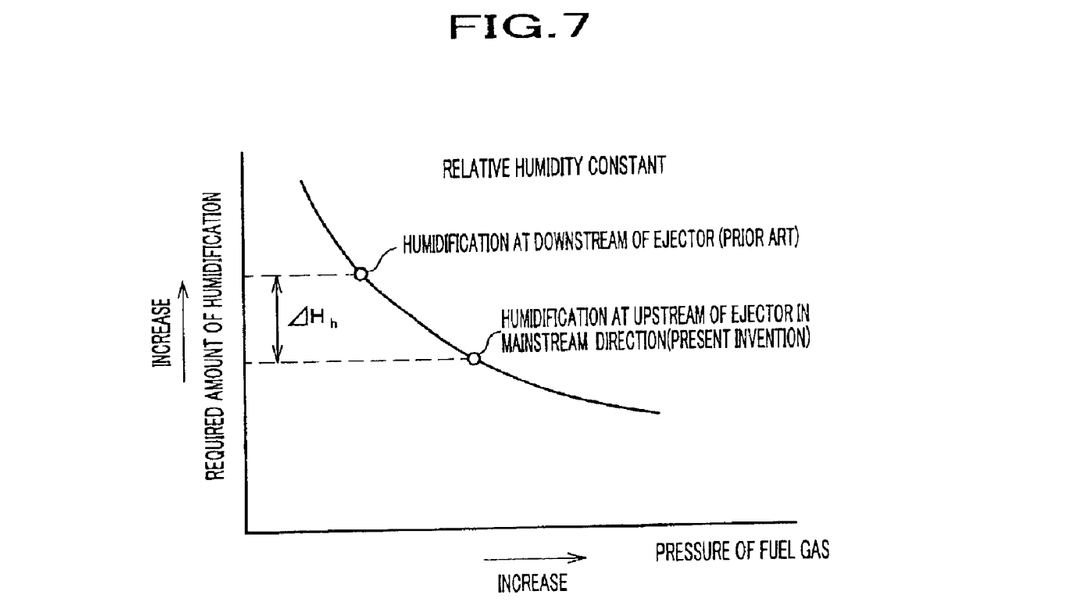
FIG. 7 is a graph illustrating a difference of the required amount of humidification between humidification at the upstream side of the ejector in the mainstream direction and humidification at the downstream side of the ejector when the relative humidity of a fuel gas that is supplied to the fuel cell is constant.

A relation between the pressure of a fuel gas and the required amount of humidification is shown in FIG. 7, wherein the relative humidity of a fuel gas supplied to the fuel cell is kept constant. As is apparent from the figure, since the required amount of humidification is lower when humidification is carried out by the humidifier arranged upstream of the ejector 4 in the mainstream direction than when humidification is carried out by the humidifier arranged downstream of the ejector 4 (herein, the temperature and the gas composition rate are constant), it is possible to reduce the size of the humidifier.

While the invention has been described in detail and with reference to a specific embodiment thereof, it will be apparent to one skilled in the art that various changes and modifications can be made therein without departing from the spirit and scope thereof.

What is claimed is:

1. A humidifying system for a fuel cell comprising:
   a fuel cell having an anode and a cathode, the anode being supplied with a fuel gas and the cathode being supplied with an oxidant gas so that the fuel gas and the oxidant gas chemically react within the fuel cell to generate electricity;
   a first humidifier transferring moisture of cathode exhaust gas discharged from the cathode of the fuel cell to the fuel gas through hollow fiber membranes;
   a second humidifier transferring moisture of cathode exhaust gas discharged from the first humidifier to the oxidant gas through hollow fiber membranes; and
   a reduced pressure generating device arranged downstream of the first humidifier and between the first humidifier and the fuel cell to mix part of anode exhaust gas discharged from the anode of the fuel cell with the fuel gas by the aid of negative pressure resulting from a flow of the fuel gas.

2. A humidifying system for a fuel cell according to claim 1, wherein said reduced pressure generating device is an ejector.

3. A method of humidifying gases supplied to a fuel cell comprising the steps of:
   supplying a fuel gas and an oxidant gas from a fuel gas supplying device and an oxidant gas supplying device to an anode and a cathode of the fuel cell, respectively, so that the fuel gas and the oxidant gas chemically react within the fuel cell to generate electricity;
   humidifying the fuel gas at a first humidifier arranged downstream of the fuel cell by transferring moisture of cathode exhaust gas discharged from the cathode of the fuel cell to the fuel gas through hollow fiber membranes; and
   humidifying the oxidant gas at a second humidifier arranged in series with and downstream of the first humidifier by transferring moisture of cathode exhaust gas discharged from the first humidifier to the oxidant gas through hollow fiber membranes;
   wherein the method further comprises the step of mixing part of anode exhaust gas discharged from the anode of the fuel cell with the fuel gas at a reduced pressure generating device which is arranged between the first humidifier and the fuel cell and at which a flow of the fuel gas causes negative pressure.

4. A method of humidifying gases supplied to a fuel cell according to claim 3, wherein said reduced pressure generating device is an ejector.

5. A humidifying system for a fuel cell comprising:
   a fuel cell having an anode and a cathode, the anode being supplied with a fuel gas and the cathode being supplied with an oxidant gas so that the fuel gas and the oxidant gas chemically react within the fuel cell to generate electricity;
   a first humidifier transferring moisture of cathode exhaust gas discharged from the cathode of the fuel cell to the fuel gas through hollow fiber membranes;
   a second humidifier transferring moisture of cathode exhaust gas discharged from the first humidifier to the oxidant gas through hollow fiber membranes; and
   a reduced pressure generating device for mixing part of anode exhaust gas discharged from the anode of the fuel cell with the fuel gas by the aid of negative pressure resulting from a flow of the fuel gas,
   wherein the reduced pressure generating device is arranged downstream of the first humidifier and between the first humidifier and the fuel cell such that, irrespective of a change in the output of the fuel cell, the fuel gas supplied to the fuel cell has a substantially constant relative humidity.

6. A humidifying system for a fuel cell according to claim 5, wherein said reduced pressure generating device is an ejector.

7. A humidifying system for a fuel cell according to claim 6, wherein said ejector has a feature such that a dew point of the fuel gas at a down stream thereof is substantially constant irrespective of dew points of the fuel gas at an upstream thereof.

8. A humidifying system for a fuel cell according to claim 5, wherein said reduced pressure generating device has a feature such that a dew point of the fuel gas at a downstream thereof is substantially constant irrespective of dew points of the fuel gas at an upstream thereof.

* * * * *